United States Patent [19]
Nashiki et al.

[11] Patent Number: 5,737,069
[45] Date of Patent: Apr. 7, 1998

[54] POSITION DETECTING APPARATUS OF OPTICAL INTERFEROMETRY

[75] Inventors: Masayuki Nashiki; Atsushi Ieki, both of Aichi, Japan

[73] Assignee: Okuma Corporation, Aichi, Japan

[21] Appl. No.: 657,100

[22] Filed: Jun. 3, 1996

[51] Int. Cl.$^6$ .................................................. G01C 03/08
[52] U.S. Cl. ...................... 356/5.13; 356/4.1; 356/4.09
[58] Field of Search .................................. 356/4.1, 4.09, 356/5.13

[56] References Cited

U.S. PATENT DOCUMENTS

| | | | |
|---|---|---|---|
| 3,542,472 | 11/1970 | Smith-Vaniz | 356/4 |
| 3,970,389 | 7/1976 | Mendrin et al. | 356/106 R |
| 5,260,761 | 11/1993 | Barker | 356/4.5 |
| 5,388,115 | 2/1995 | Kawashima et al. | 372/24 |
| 5,589,928 | 12/1996 | Babbitt et al. | 356/4.1 |

*Primary Examiner*—Mark Hellner
*Attorney, Agent, or Firm*—Oliff & Berridge, PLC

[57] ABSTRACT

A position detecting apparatus utilizing optical interferometry changes the wavelength of a light beam from the light source. The variation in the wavelength causes an increment and decrement Cx, Co in the number of waves in the measurement and reference lengths Lx, Lo. The position data calculating section calculates the measurement length Lx on the basis of the detected increment and decrement Cx, Co and the reference length Lo according to an equation, Lx=Lo(Cx/Co). The position detecting apparatus can easily detect an absolute position of an object to be detected.

9 Claims, 13 Drawing Sheets

POSITION DETECTING APPARATUS OF OPTICAL INTERFEROMETRY

BACKGROUND OF THE INVENTION

1. Field of the Invention

The present invention relates to a position detecting apparatus used for detecting a displacement position or an angle of the rotation axis of a working stage in a precision industrial machine or a machining tool, and more particularly, to a position detecting apparatus utilizing optical interferometry, in which a reference light from a reference plane and a measurement light from a measurement plane are brought together so as to form interference light, so that a difference between the optical path lengths of the reference light and the measurement light is measured on the basis of the optical intensity of the interference light, whereby position data of an object is obtained based on the difference.

2. Description of the Prior Art

FIG. 13 illustrates a laser length measuring instrument, which is an example of a position detecting apparatus of optical interferometry employing an optical heterodyne method. The laser length measuring instrument forms interference light ML by bringing together a laser beam reflected from a movable mirror 10 on an object and a laser beam reflected from a stationary mirror 11. The variation in the optical intensity of the interference light ML is detected in response to the movement of the movable mirror 10, to thereby obtain the displacement X of the object.

Laser source 12 as a light source or emits a light beam towards a separation plane P1. The laser source 12 comprises a He—Ne laser which outputs two laser beams (light beams OL) on the respective planes of polarization which are orthogonal to each other. The laser beams have different frequencies f1 and f2, respectively. A polarization beam splitter 13 receives laser beams so as to split the beams into measurement light L1 of frequency f1 and reference light L2 of frequency f2 at the separation plane P1.

The measurement light L1 is irradiated toward a measurement plane which is defined on the movable mirror 10 fixedly mounted on an object. The measurement light L1 reflected from the measurement plane is subjected to Doppler modulation of frequency Δf in proportion to the velocity of the movable mirror 10 in the direction X, and then returns to the polarization beam splitter 13. The reference light L2 is reflected at a reference plane on the stationary mirror 11, and then returns to the polarization beam splitter 13. The polarization beam splitter 13 brings together the measurement light L1 and the reference light L2 so as to form interference light ML for measurement. The movement of the object causes an increase or a decrease in the optical length on which the measurement light L1 travels from the separation plane P1 to a point P2 on the polarization beam splitter 13. The increase or decrease in the length serves to shift the phase of the measurement light L1 with respect to that of the reference light L2 at the point P2. The shift in the phase causes the optical intensity of the measurement interference light ML to be varied.

A beam receiver 14 electrically detects the optical intensity in the interference of the measurement interference light ML. In other words, the beam receiver 14 photoelectrically converts the measurement interference light ML into a measurement electrical signal Fp (beat signal) which has a differential frequency obtained from f1±Δf and f2.

The light beam OL is split at a beam splitter 15, so that the split light beam is supplied to a photoelectric device 16, which photoelectrically converts the above mentioned two laser beams with different frequencies into a reference electrical signal Fr (beat signal) of a differential frequency obtained from f1 and f2.

The phase shift between the measurement and reference electrical signals Fp and Fr indicates the difference in the optical length between the measurement and reference lights L1 and L2. The phase shift of the measurement electrical signal Fp with respect to the reference electrical signal Fr represents the relative displacement X of the object or the movable mirror 10 since the phase of the reference electrical signal Fr is fixed because of the fixed optical length of the reference light L2, which is represented by the reference electrical signal Fr. This principle is the basis for the calculation of the phase shift between the measurement and reference electrical signals Fp and Fr by the calculation circuit 17 while the object is moving, so that the relative displacement X is measured as position data of the object on the basis of the phase shift.

Assuming that the wavelength of a laser beam is $\lambda$, when the object is displaced by an amount X, the phase shift between the signals Fp and Fr is designated as $4\pi(X/\lambda)$. The phase of the measurement electrical signal Fp accordingly coincides with that of the reference electrical signal Fr for every cycle of the phase, that is, every time the phase shift is changed by $\lambda/2$. The calculation circuit 17 thus includes a measurement device for determining a measurement value $\Delta x$ within a range between 0 and $\lambda/2$, and a counter for counting the number Xu of cycles of the phase shift based on the determined measurement value $\Delta x$. The position data X is output based on the equation $X=(\lambda/2)Xu+\Delta x$.

The calculation circuit 17 measures a phase shift between the signals Fp and Fr in accordance with a predetermined sampling time. The sampling time is set such that the amount of variation between the last measurement value $\Delta x(last)$ and the current measurement value $\Delta x(curr)$ remains within a range of $\pm\lambda/4$. This setting of sampling time enables a simple and reliable counting of the number Xu of cycles by comparison between the measurement values $\Delta x(last)$ and $\Delta x(curr)$.

When the inequality $\Delta x(curr)-\Delta x(last) \leq -\lambda/4$ is established, that is, the current measurement value is smaller than the last measurement value by the amount equal to or more than $\lambda/4$, the measurement device determines that an additional cycle is achieved for the number Xu of completed cycles, so that an up pulse is output from the measurement device so as to increase the value of the counter by one. For instance, assume that the last measurement value or $\Delta x(curr)$ $=\lambda/4$ and the current measurement value or $\Delta x(last)=(3\lambda)/4$. Since $\Delta x(curr)-\Delta x(last)=-\lambda/2$ is established, the value of the counter is increased by one. The measurement value can possibly become $\lambda/4$ in two ways. One is in a case where the measurement value is increased from $(3\lambda)/4$ after the transition to the next cycle. The other is in a case where the measurement value is simply decreased from $(3\lambda)/4$. However, since the sampling time has been set such that the amount of variation between values of two successive measurements would stay within the range of $\pm\lambda/4$, the variation to the $\Delta x(curr)$ can be determined as the result of an increase after the transition to the subsequent cycle. Likewise, when the inequality $\Delta x(curr)-\Delta x(last) \geq \lambda/4$ is established, in other words, the current measurement value is larger than the last measurement value by the amount equal to or more than $\lambda/4$, the measurement device determines that the number Xu of cycles should be decreased by one, and thus outputs a down pulse so as to decrease the value of the counter by one.

A part of the light beam OL split at the beam splitter 15 is also supplied to a photoelectric device 18.. The electrical signal is obtained from the photoelectric device 18 and is then supplied to a laser tuning circuit 19. The laser tuning circuit 19 is designed to stabilize the laser source 12.

The above described position detecting apparatus utilizing optical interferometry, however, requires movement of an object because the apparatus measures the variation in the optical intensity of interference light, which variation is caused by an increase or a decrease of the optical length of the measurement light. The apparatus is accordingly required to set a reference point at the beginning of the position detection, so that the relative displacement of the object from the reference point is incrementally measured. This principle causes the following disadvantage: (1) the erroneous counting of the number Xu of cycles will be accumulated in the measurement; (2) the interruption of the optical path of measurement light will lead to the loss of the current position, so that the object is required to return to the home position so as to again establish the reference point; and (3) the switching-off of the apparatus will cause the loss of the current position, so that the reference point must be established every time the apparatus is switched on.

In addition, the above described apparatus requires a large and expensive light source, such as He—Ne laser sources for two frequencies. Some may propose the utilization of a small semiconductor laser instead, which leads to another disadvantage. The wavelength of a semiconductor laser cannot be stabilized sufficiently and hence, the variation and the error in the wavelength undesirably affect the measurement accuracy, in particular, when employed in a Michelson interferometer.

Further, the ambient environments of measurement and the movement of the object may incur fluctuation in the air around the optical path, which will lead to unreliable measurement data.

SUMMARY OF THE INVENTION

The present invention therefore aims to provide a position detecting apparatus utilizing optical interferometry capable of easily detecting an absolute position of an object to be detected.

The present invention further aims to provide a small and inexpensive position detecting apparatus utilizing optical interferometry wherein the variation of the wavelength of a semiconductor laser does not affect the measurement accuracy when a semiconductor laser is employed as a light source.

The present invention still further aims to provide a position detecting apparatus utilizing optical interferometry resistive to the changes of the ambient environment of the measurement.

According to the first aspect of the present invention, there is provided a position detecting apparatus of optical interferometry, comprising: a light source capable of emitting a light beam having an interference capability; a wavelength control section capable of varying a wavelength of the light beam emitted from the light source; a relative displacement interference section capable of bringing reference and measurement light together so as to output interference light for relative displacement, the reference light having been separated from the light beam at a separation plane and reflected from a reference plane, the measurement light having been separated from the light beam and reflected from a measurement plane defined on an object; a reference length interference section capable of bringing rays of light together so as to output interference light for reference length on the basis of a reference length light beam separated from the light beam, the rays of light having a difference in optical length corresponding to a predetermined reference length; and a position data determining section capable of determining position data of the object on the basis of the predetermined reference length and variation in optical intensities of the interference lights for relative displacement and reference length when the wavelength control section varies the wavelength of the light beam.

With the above arrangement, position data of an object can be detected on the basis of a predetermined reference length and variations in the optical intensities for the interference light for relative displacement and reference length when the wavelength control section varies the wavelength of the light beam, so that an absolute position of the object can easily and reliably be detected. The current position can be detected as an absolute position irrespective of any erroneous counting to be accumulated, any interruption of the optical length, or the turning off of the apparatus. It is accordingly possible to omit returning of the object to the home position, thereby leading to a reduction in the sequences and a reliable detection.

In addition, the accuracy in varying the wavelength can be rough enough to measuring the increment and decrement in the number of waves, so that an accurate detection can be achieved even when using as a light source a semiconductor laser which has an unstable oscillation frequency. Therefore, it is possible to provide a compact and inexpensive position detecting apparatus with a highly accurate detection.

Furthermore, variations in the ambient environment, such as air fluctuation, do not hinder a stable measurement, so that highly accurate measurement can be achieved under any ambient environment.

According to the second aspect of the invention, the reference length interference section of the first aspect may comprise a reference plane capable of reflecting the rays separated from the reference length light beam at a separation plane; and a measurement plane capable of reflecting the rays separated from the reference length light beam from the separation plane; the interference light being formed by bringing together the rays from the reference and measurement planes, the rays from the measurement plane having a difference in optical length corresponding to the predetermined reference length with respect to the rays from the reference plane. The reference length interference section can be realized with a simple structure.

According to the third aspect of the present invention, in addition to the second aspect, the position data determining section may comprise a first counting circuit capable of counting increment and decrement Co of waves in the interference light for reference length when the wavelength control section varies the wavelength of the light beam; a second counting circuit capable of counting increment and decrement Cx of waves in the interference light for relative displacement when the wavelength control section varies the wavelength of the light beam; and an absolute position data calculation circuit capable of calculating a position Lx of the object with respect to the separation plane in the relative displacement interference section on the basis of an equation, $Lx=Lo(Cx/Co)$, wherein Lo is the reference length defined between the separation and measurement planes in the reference length interference section. The position data calculating section can be realized with a simple structure.

According to the fourth aspect of the present invention, in addition to the first aspect, the position data determining section may comprise an absolute position data calculation section capable of calculating absolute position data of the object on the basis of the reference length and the variation in optical intensities for the interference light for relative displacement and reference length when the wavelength control section varies the wavelength of the light beam; a relative position data calculation section capable of calculating relative position data of the object with respect to an absolute position of the object on the basis of the variation in optical intensity of the interference light for relative displacement in response to movement of the object; and a composite calculation section for combining the absolute and relative position data so as to determine a position of the object.

With the above arrangement, the detection of position data by varying the wavelength, which requires a longer response time, can be carried out in an initial sequence after turning on the switch, so that only relative position data needs to be obtained thereafter in the subsequent sequences. The response for position detection can be improved in the subsequent sequences after the initial sequence by omitting the time-consuming detection by varying the wavelength. Further, unlike sole incremental detection, an absolute position of the object can easily be detected by the absolute position data calculation section irrespective of any erroneous counting during measurement or interruption in the optical path, which would normally cause the loss of the current position, or the turning off of the switch during measurement. It is not required to return the object to the home position.

According to the fifth aspect of the present invention, the position data determining section further comprises a wavelength variation detecting section for detecting variation in the wavelength of the light beam from the light source on the basis of the interference light for relative displacement from the relative displacement interference section; and a wavelength correcting section for correcting the relative position data on the basis of the variation detected by the wavelength variation detecting section.

With the above arrangement, when the wavelength of the light beam from the light source varies as time elapses, so as to exhibit a tendency in which the value of the relative position data follows non-linearity compared to the beginning of the detection, such a tendency can be balanced by correcting the variation of the wavelength. It is possible to detect a highly accurate absolute position irrespective of the variation in the wavelength.

According to the sixth aspect of the present invention, the light source comprises a semiconductor laser, and the wavelength control section varies the wavelength of the light beam by changing the temperature of the semiconductor laser. According to the seventh aspect of the present invention, the wavelength control section varies the wavelength of the light beam by causing stress in a medium, through which the light beam is transmitted, so as change the refractive index of the medium. According to the eighth aspect of the present invention, the wavelength control section varies the wavelength of the light beam by applying an electrical and/or a magnetic field to a medium, through which the light beam is transmitted, so as to change the refractive index of the medium. According to the ninth aspect of the invention, the wavelength control section varies the wavelength of the light beam using a Doppler effect caused by rotation of a rotatable plate of a predetermined refractive index. With any of these features, the wavelength of the light beam from the light source can be varied with a simple structure.

BRIEF DESCRIPTION OF THE DRAWINGS

The above and the other objects, features and advantages will be apparent from the following description of the preferred embodiment taken in conjunction with the accompanying drawings wherein.

DESCRIPTION OF THE PREFERRED EMBODIMENTS

Figure 1:
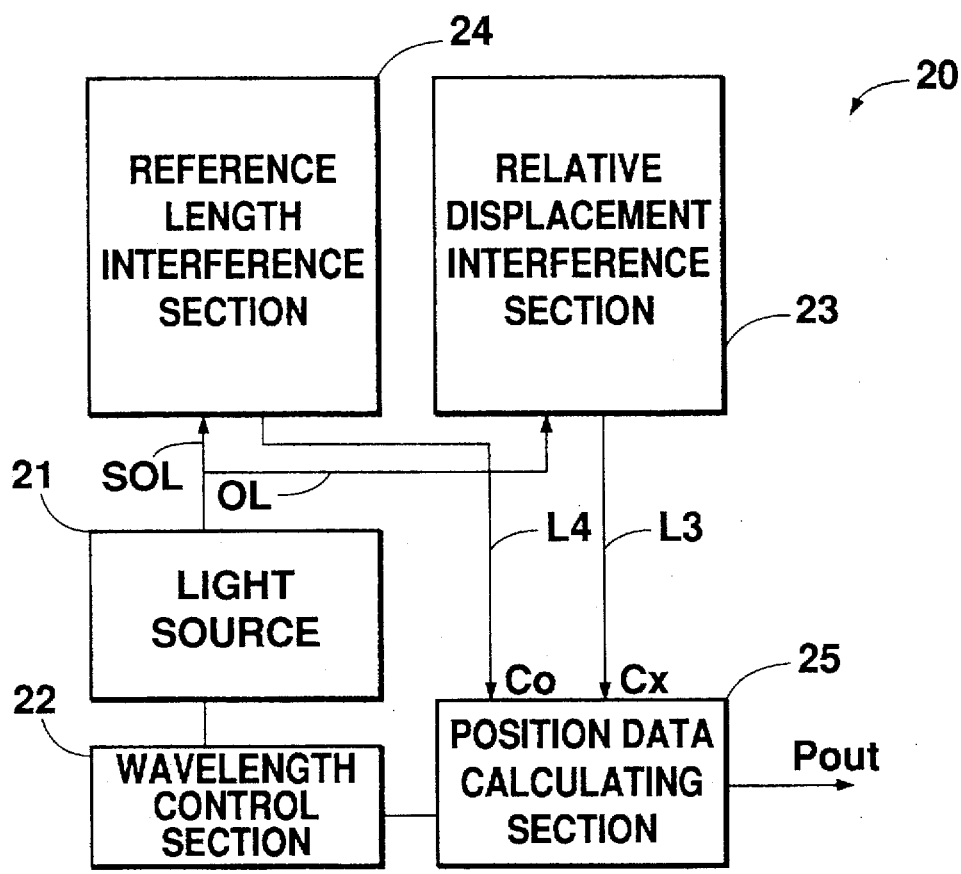
FIG. 1 is a schematic representation illustrating a position detecting apparatus utilizing optical interferometry according to the present invention.

FIG. 1 illustrates a schematic representation of a position detecting apparatus 20 utilizing optical interferometry according to a first embodiment of the present invention. The position detecting apparatus 20 comprises a light source 21 for emitting a light beam OL. The wavelength of the light beam OL can optionally be varied by a wavelength control section 22. A relative displacement interference section 23 brings together reference light and measurement light out of the light beam OL so as to output interference light L3 for relative displacement. The reference and measurement light have a difference in optical length corresponding to a distance to an object. A reference length interference section 24 brings together two rays of a light beam out of a reference length light beam SOL so as to output interference light L4 for reference length. The two light rays have a difference in optical length corresponding to a predetermined reference length. A position data calculating section 25 calculates position data of an object on the basis of the reference length and the variations in the optical intensity of the interference light L3, L4 for relative displacement and reference length. The position detecting apparatus 20 causes variation in optical intensity of the interference light L3, L4 for relative displacement and reference length, without moving an object, by changing the wavelength of the light beam OL from the light source 21.

Figure 2:
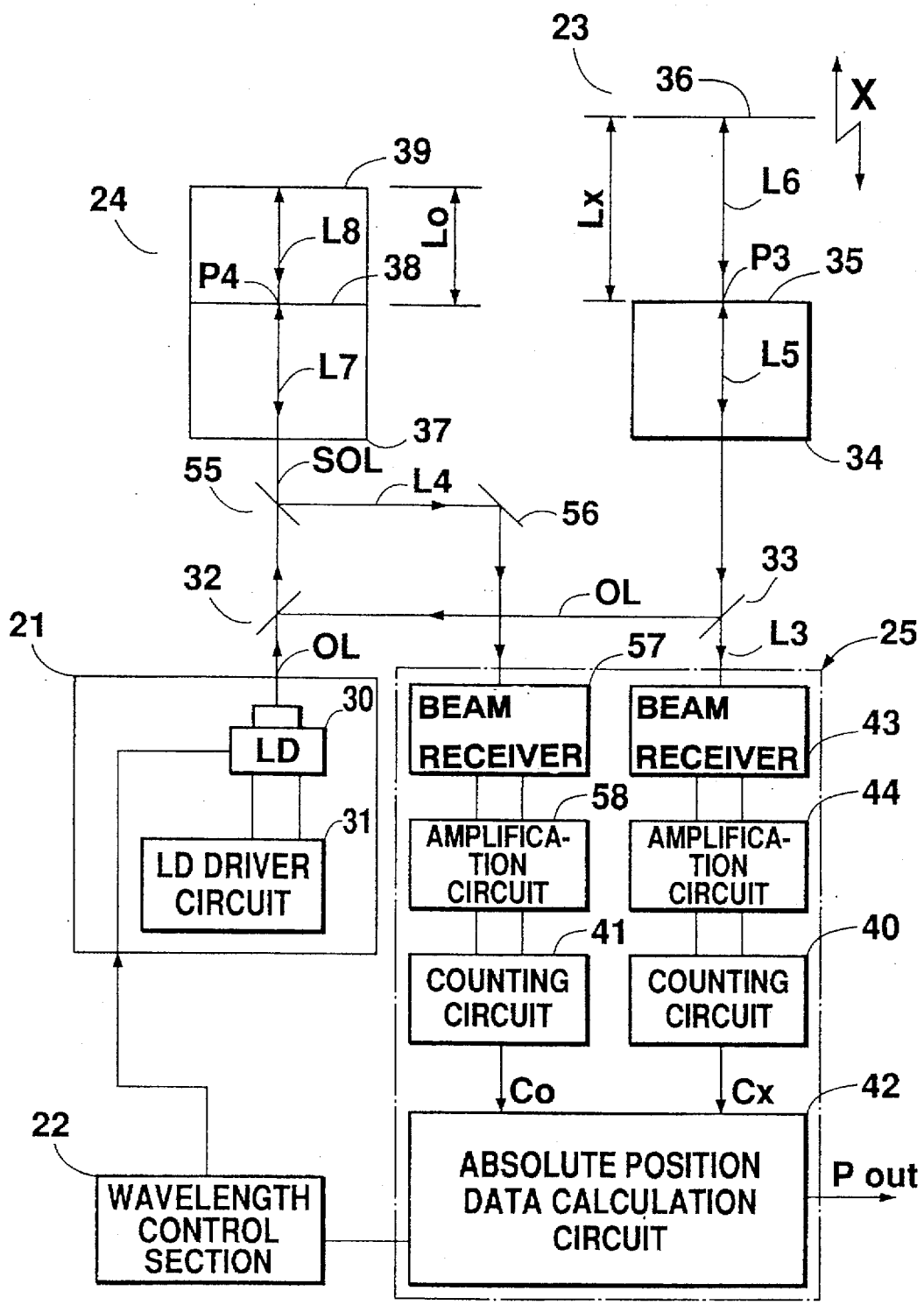
FIG. 2 illustrates an exemplary structure of the position detecting apparatus according to the first embodiment.

The light source 21 includes, as shown in FIG. 2, a semiconductor laser 30 of GaAs type or the like. The semiconductor laser 30 is driven by a semiconductor laser driver circuit 31 and outputs a laser light beam OL which has a desired wavelength. The output laser light beam OL is directed, via two beam splitters 32 and 33, to a separation plane P3 of the relative displacement interference section 23.

Figure 3:
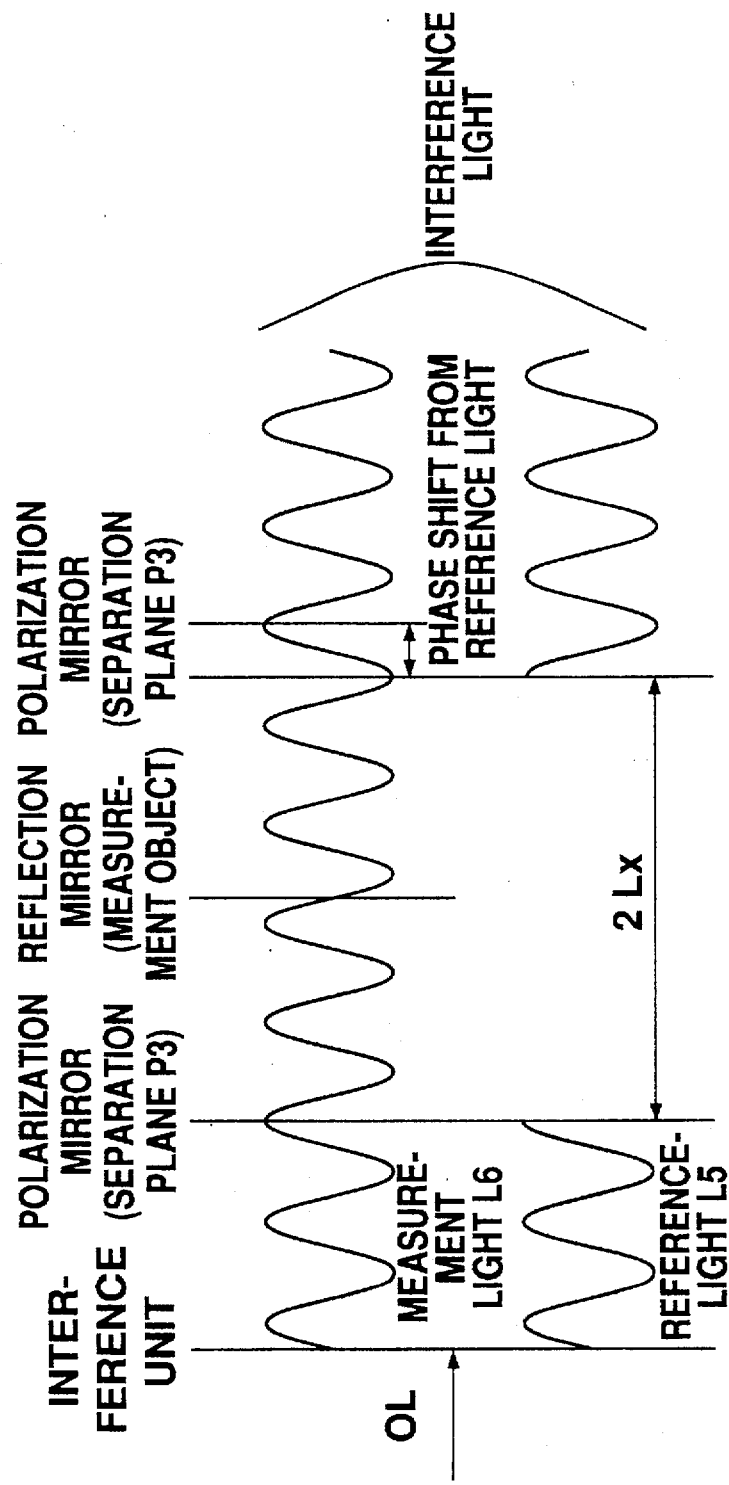
FIG. 3 is an illustration for explaining the formation of interference light from measurement and reference light.

The relative displacement interference section 23 includes an interference unit 34 for splitting the light beam OL into two light beams, namely a reference and a measurement light L5, L6 in the relative displacement interference section 23. The light L5, L6 have planes of polarization orthogonal to each other. The reference light L5 is separated from the light beam OL at the separation plane P3 through reflection at a stationary polarization mirror 35, that is, a reference plane. The measurement light L6 is separated from the light beam OL at the separation plane P3 by transmission through the polarization mirror 35. The measurement light L6 is then reflected at a measurement plane or a reflection mirror 36 which is fixed to an object to be detected. The reference light L5 from the polarization mirror 35 and the measurement light L6 from the reflection mirror 36 are brought together at the separation plane P3 for forming interference light L3 for relative displacement. The difference in optical length between the reference and measurement lights L5 and L6 is equal to twice the length Lx defined between the polarization mirror 35 and the object namely the reflection mirror 36. The optical waves existing in a path corresponding to the difference 2Lx of optical length cause, as shown in FIG. 3, a phase shift θ between the reference and measurement light L5, L6, which phase shift θ is represented by the number of waves. The phase shift θ in turn causes interference fringes of the interference light L3 for relative displacement.

The reference length interference section 24 includes an interference unit 37 for splitting the light beam SOL into two light beams, namely, reference and measurement light L7, L8 in the relative displacement interference section 24. The two light beams have planes of polarization orthogonal to each other. The reference light L7 is separated from the reference length light beam SOL at a separation plane P4 through reflection at a reference plane, namely, a stationary polarization mirror 38. The measurement light L8 is separated from the light beam SOL by transmission through the polarization mirror 38 and is then reflected at a measurement plane or a stationary reflection mirror 39. The reference light L7 from the polarization mirror 38 and the measurement light L8 from the reflection mirror 39 are brought together at the separation plane P4 for forming interference light L4 for reference length. The polarization and reflection mirrors 38, 39 are positioned at a distance of the reference length Lo, so that the difference in optical length between the reference and measurement light L7, L8 is equal to twice the reference length. The optical waves existing in a path corresponding to the difference 2Lo of the optical length cause a phase shift θ between the measurement and reference lights L7, L8, which phase shift θ is represented by the number of waves. The phase shift θ in turn causes interference fringes of the interference light L4 for reference length.

Figure 13:
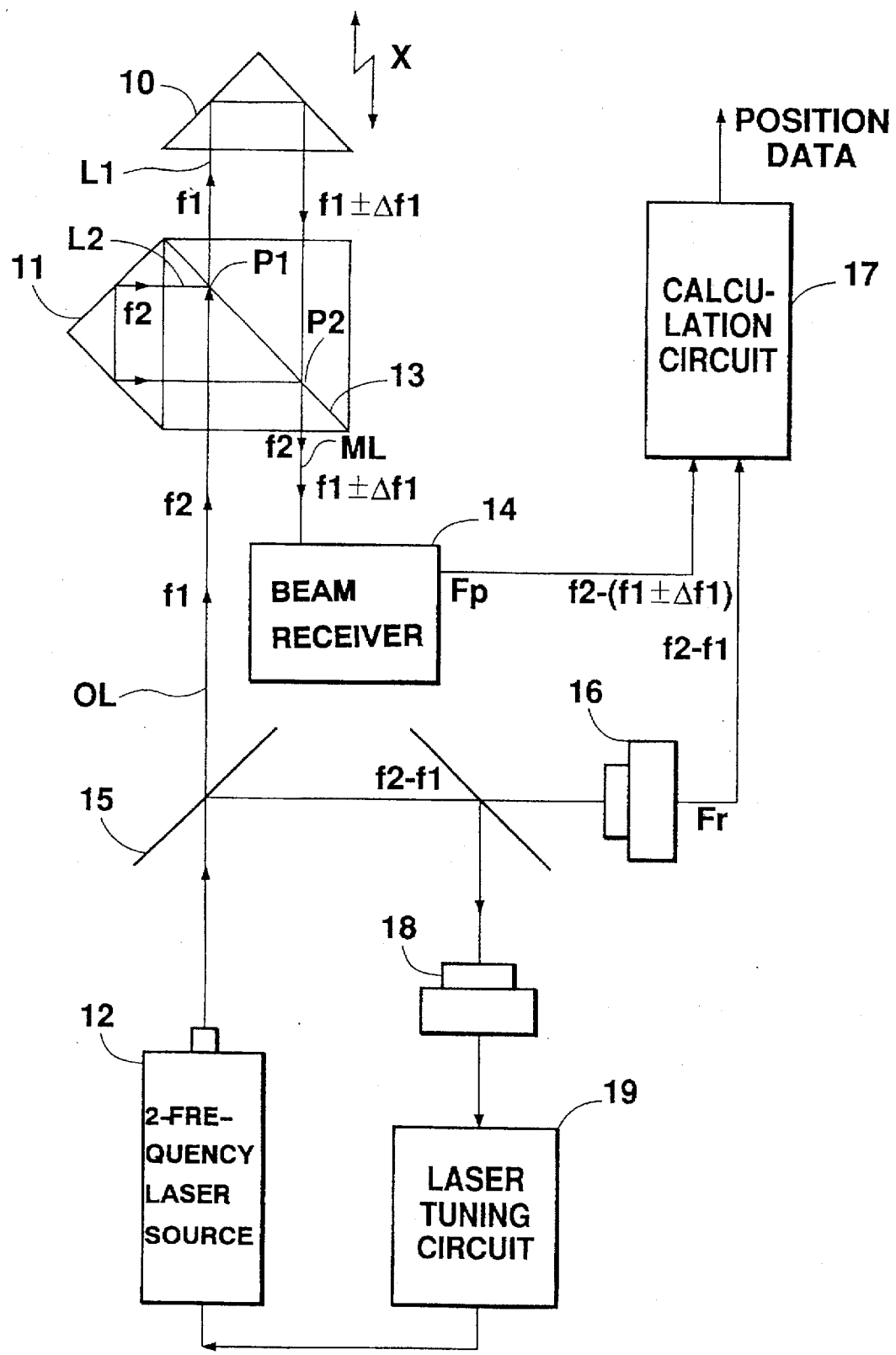
FIG. 13 illustrates an exemplary structure of a conventional position detecting apparatus utilizing optical interferometry employing an optical heterodyne method.

It should be noted that the polarization mirrors 35, 38 in the relative displacement and reference length interference sections 23, 24 may respectively comprise a beam splitter 13 of FIG. 13 which has an angular plane of 45 degree with respect to the light beam. In this case, a light beam irradiated to the beam splitter is split into two light beams: the first one goes straight and the second one goes in a direction perpendicular to the first one. The two split light beams are respectively reflected at the reference and measurement planes and are then brought together at the beam splitter for an output of an interference light L3, L4.

The position data calculating section 25 comprises a first counting circuit 40 for counting increment and decrement Cx in the number of waves of the interference light L3 for relative displacement, and a second counting circuit 41 for counting increment and decrement Co in the number of waves of the interference light L4 for reference length. The counted increment and decrement Cx, Co are supplied to an absolute position data calculation circuit 42 where a position Lx of the object from the separation plane P3 in the relative displacement interference section 25 is calculated from the equation Lx=Lo(Cx/Co) on the basis of a principle which will be described later, wherein Lo represents the reference length from the separation plane P4 to the measurement plane 39 in the reference length interference section 24. The value Lx is output as position data Pout of the object.

The interference light L3 for relative displacement, which is irradiated to the position data calculating section 25, is photoelectrically converted into two signals for optical intensity at a beam receiver 43. The two signals have different phases from each other. The electrical signals are then voltage amplified in an amplification circuit 44. The amplified electrical signals are supplied to the counting circuit 40, where the increment and decrement Cx of the number of waves are counted on the basis of the two signals for optical intensity.

Figure 4:
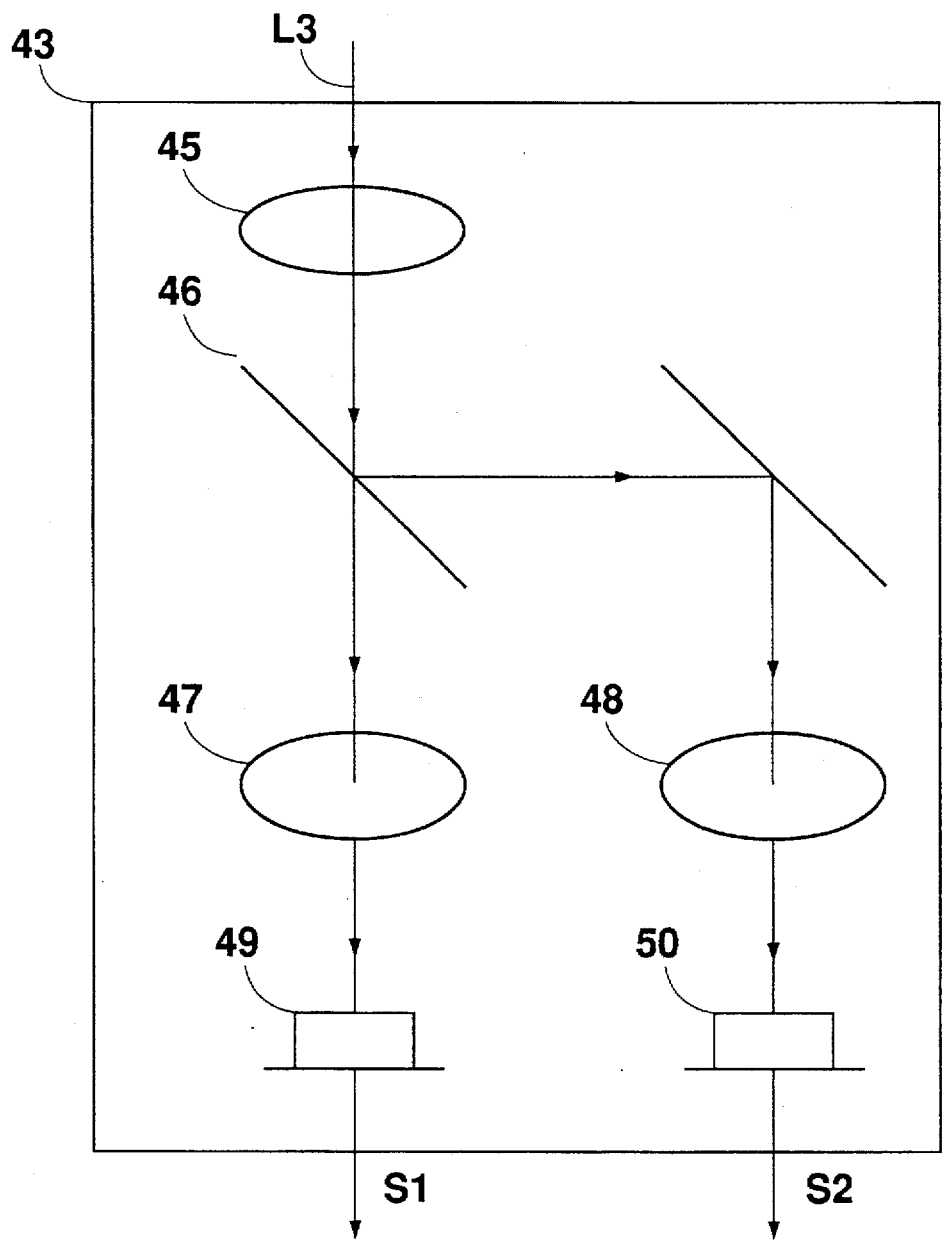
FIG. 4 illustrates a detailed structure of a beam receiver.

The interference light L3 for relative displacement, which is irradiated to the beam receiver 43, is converted to circular polarized light by a λ/4 retardation sheet 45, as is apparent from FIG. 4, and is then split into two light beams by a beam splitter 46. The split light beams are respectively transmitted through first and second polarization plates 47, 48, which have polarizing angles shifted by π/4 from each other. The two transmitted light beams are converted into electrical signals S1, S2 by first and second photoelectric devices 49, 50, respectively. The electrical signals S1, S2 have sinusoidal waveforms with a π/2 phase shift. The cycle of the waveforms corresponds to the displacement X=λ/2 of the object. This type of method my generally be used in the field of an interferometry for making signals of different phases by employing a λ/4 retardation sheet and two polarizing plates. Alternatively, two polarization plates my be employed to have a π/2 or (3π)/4 shift in polarizing angles so as to provide electrical signals having π or (3π)/2 phase shift.

The amplification circuit 44 serves to convert the electrical signals S1, S2 from an electrical current form to a voltage form, by using a current/voltage circuit. The converted signal is then amplified to a sufficient voltage level by an amplifier.

Figure 5:
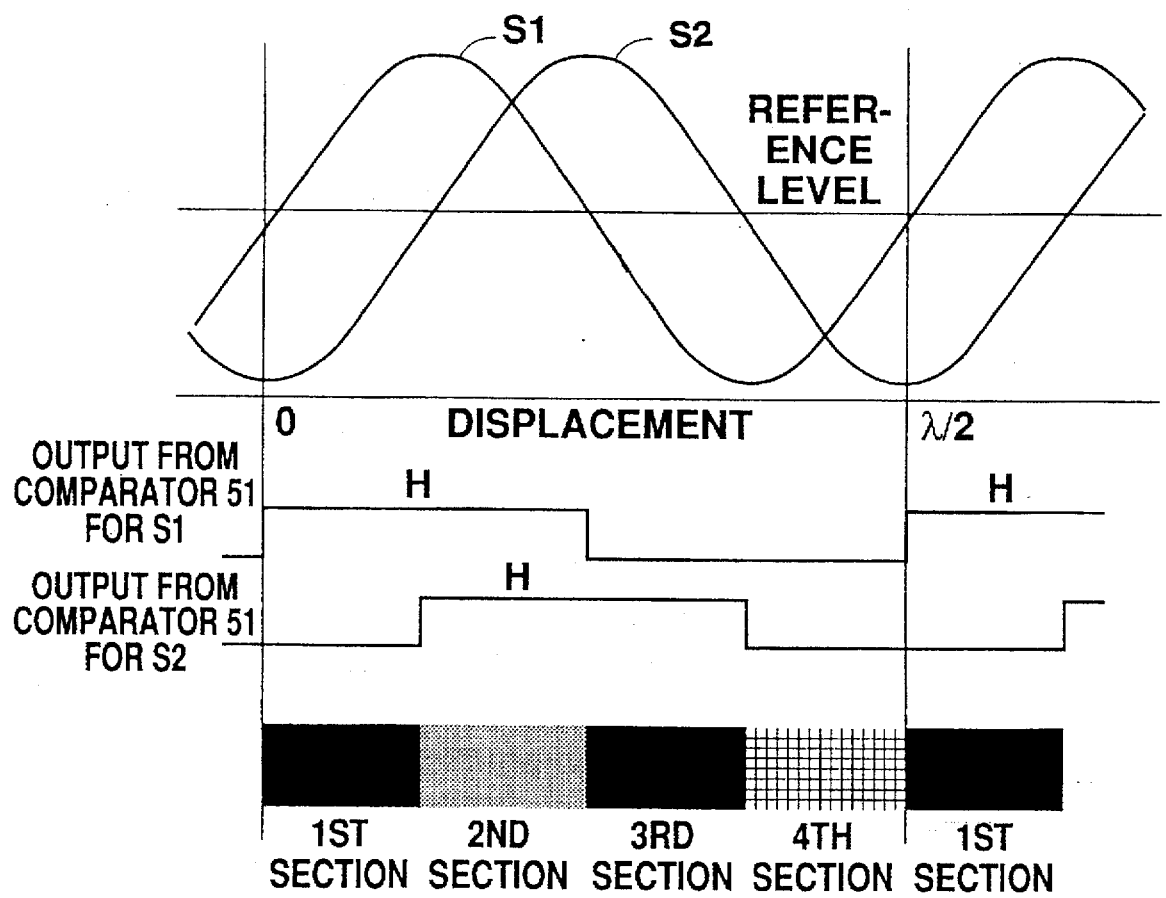
FIG. 5 is a graph illustrating the relationship between an electrical signal from the beam receiver and a comparator in a counting circuit.
Figure 6:
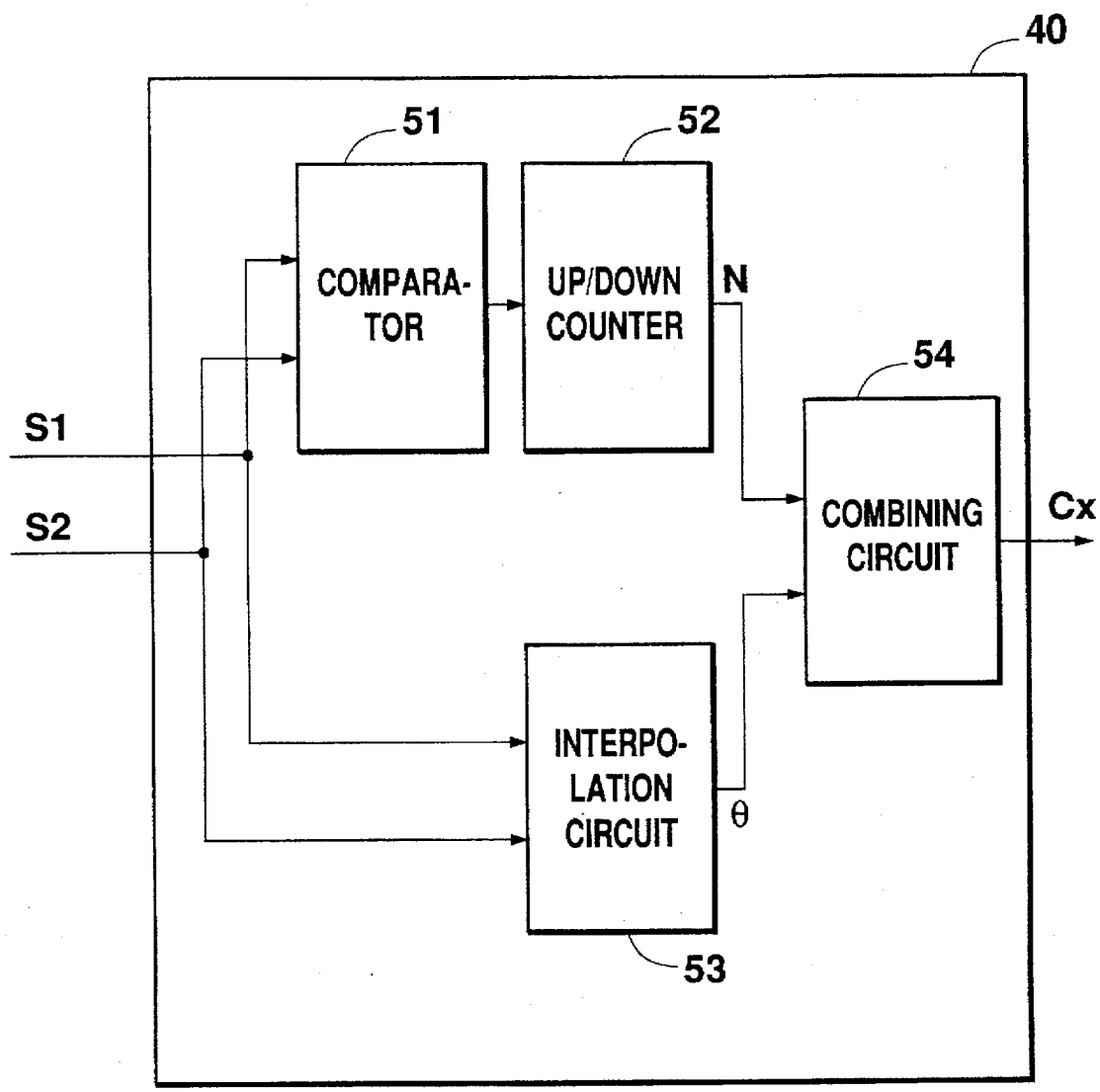
FIG. 6 illustrates a detailed structure of a counting circuit.

FIG. 6 illustrates the counting circuit 40 including a comparator 51 for converting the voltage signals S1, S2 into pulse signals, and an UP/DOWN counter 52 for counting the number N of cycles of the signals S1, S2 on the basis of the pulse signal from the comparator 51. The comparator 51 compares the levels of the signals S1, S2, as shown in FIG. 5, with a predetermined reference level, such as the median of the amplitude of the sine wave. When the levels of the electric signals S1, S2 are detected to be larger than the reference level, an H signal is output. This comparator 51 is designed to determine first to fourth quarter sections for a cycle of a signal for optical intensity on the basis of the pulse signals for the signals S1, S2. The UP/DOWN counter 52 counts the number N of cycles and detects the direction of a variation in phase shift, both on the basis of the changes of the pulse signals in the respective first to fourth quarter sections.

The counting circuit 40 further includes an interpolation circuit for determining the relative locations of the electrical signals S1, S2 within the cycle. The electrical signals S1 and S2 are expressed by:

$$S1 = A1\cos(\theta) + B1$$

$$S2 = A2\sin(\theta) + B2 \qquad (1)$$

The constants A1, A2, B1 and B2 can be previously measured and eliminated from the equations as follows:

$$S1 = \cos(\theta)$$

$$S2 = \sin(\theta) \qquad (2)$$

The electrical angle θ for the electrical signals S1, S2 can be expressed by:

$$\theta = \arctan\left(\frac{S2}{S1}\right) \qquad (3)$$

thereby calculating the electrical angle θ corresponding to the phase shift within one cycle or λ/2 of the wave.

The counting circuit 40 further includes a combining circuit 54 for calculating increment and decrement Cx of waves on the basis of $$Cx = \frac{N}{2} + \frac{\theta}{2\pi} \cdot \frac{1}{2} \qquad (4)$$

wherein N represents the number of cycles; and θ represents the electrical angle. A method for generating countable waves will be described later.

The interference light L4 for reference length, which is irradiated via two reflection mirrors 55, 56 to the position data calculating section 25, is converted into an electrical signal in the beam receiver 57, and is then subjected to voltage amplification in an amplification circuit 58. The amplified electrical signal is supplied to a counting circuit 41. The functions of the beam receiver 57, the amplification circuit 58 and the counting circuit 41 are the same as those of the beam receiver 43, the amplification circuit 44 and the counting circuit 40, respectively, so the detailed description thereof is omitted here.

The absolute position data calculation circuit 42 calculates a distance Lx between the separation plane P3 and an object on the basis of the reference length Lo, and increment and decrement Cx, Co in the number of waves of the interference light L3, L4 for relative displacement and reference length. The increment and decrement Cx, Co is caused by a continuous variation, in a digital or an analog manner, in the wavelength of the light beam OL and the reference length light beam SOL from the light source 21.

Figure 7:
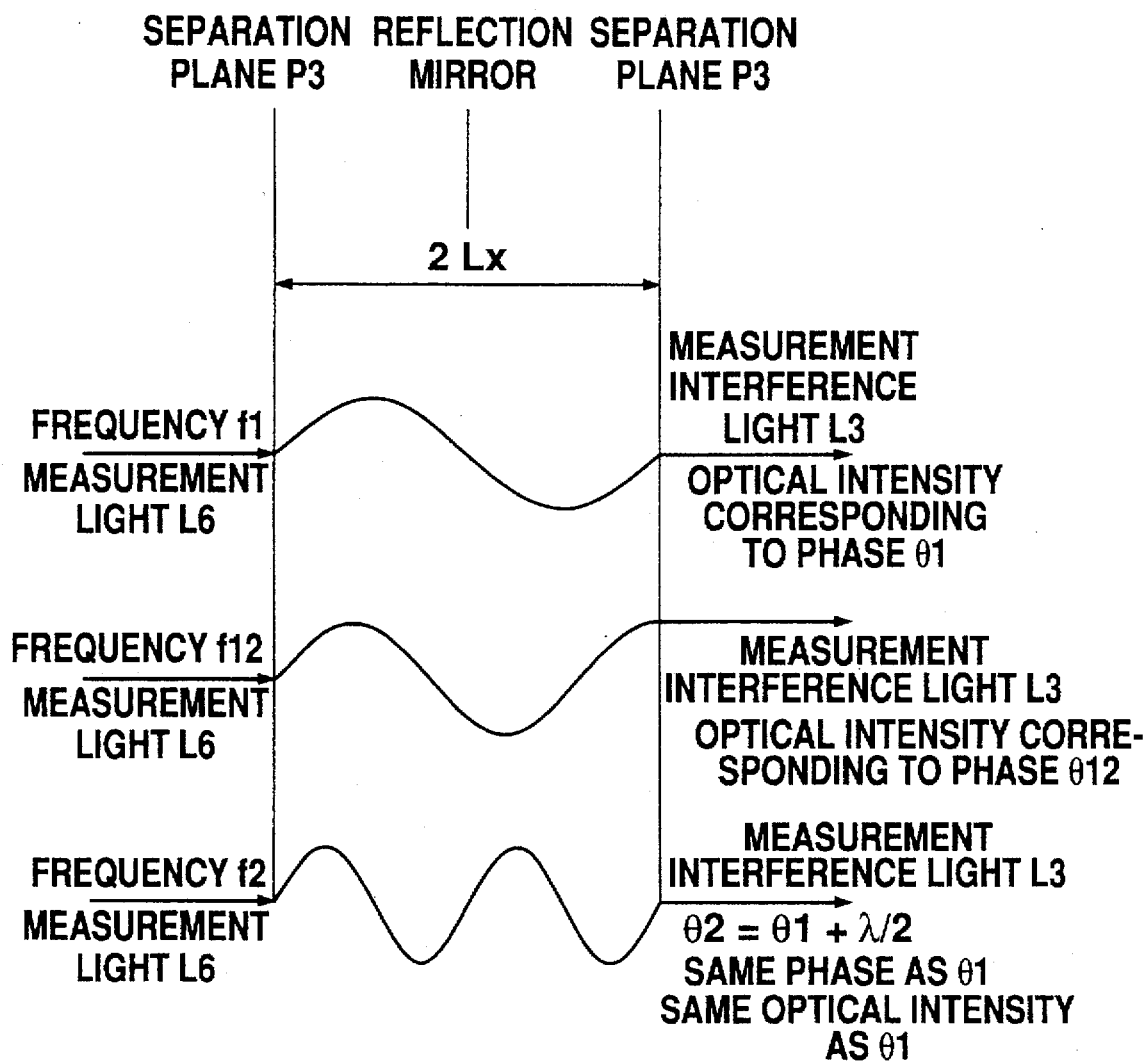
FIG. 7 is an illustration for explaining the principle of measuring an interference fringe by varying the wavelength of a light beam.

Assume that the wavelength control section 22 continuously reduces from λ1 to λ2 the wavelength of the light beam OL emitted from the light source 21, in stead of the displacement X which an object moves along. The reduction in the wavelength, in the optical length 2Lx of FIG. 7 on which the measurement light L6 reciprocates from the separation plane P3 in the relative displacement interference section 23, causes the number of waves to be increased from n1 to n2. Every λ/2 increment in the number of waves causes the counting of brightness and shadow in an interference fringe, in a similar manner where the object is displaced by the amount X=λ/2. FIG. 3 illustrates no phase shift between the reference and measurement lights L5, L6 upstream of the separation plane P3. After being separated at the separation plane P3, the measurement light L6 of frequency f1 additionally travels along the optical length 2Lx compared with the reference light L5. When the measurement light L6 returns to the separation plane P3, the number of waves in the optical length 2Lx causes a phase shift θ1 to the reference light L5. This phase shift θ1 is represented by an optical intensity of the interference light L3 for relative displacement. When the wavelength is reduced, the number n of optical waves is gradually increased, as shown in FIG. 7. As the number n of waves increases, the phase of the measurement light L6 gradually varies at the separation plane P3 from θ1 via θ12 to θ2 with the phase of the reference light L5 being maintained at θ1. The variation in the optical intensity due to the variation in the wavelength is photoelectrically converted in the beam receiver 43, so that electrical signals S1 and S2 are obtained. According to this principle, when the wavelength λ of the light beam OL is varied with an object maintained at position X such that the number n of waves is varied by ±½, the sinusoidal waveform of the electrical signals S1, S2 varies by one cycle.

The wave number data Cx, which has been calculated in the counting circuit 40, corresponds to the increment in the number of waves in the measurement length Lx before and after the change of the wavelength, that is, ΔCx=n2−n1. The measurement length Lx before the change of the wavelength is expressed as follows:

$$Lx = \frac{C}{f1} \cdot n1 \qquad (5)$$

wherein C represents an optical velocity and C/f1 represents the wavelength of an optical wave. Likewise, the measurement length Lx after the change of the wavelength is expressed as follows:

$$Lx = \frac{C}{f2} \cdot n2 \qquad (6)$$

Accordingly, $$\Delta Cx = n2 - n1 = \frac{f2 - f1}{C} \cdot Lx \qquad (7)$$

is obtained. It is understood that the counted variation ΔCx in the number of waves is proportional to the measurement length Lx.

Likewise, the variation Co, which is counted in the counting circuit 41, corresponds to the increment in the number of waves in the reference length Lo before and after the change of the wavelength, that is, ΔCx=n4−n3, wherein n3 represents the number of waves existing in the reference length Lo before the change of the wavelength, and n4 represents the number of waves existing in the reference length Lo after the change of the wavelength. It is also understood from $$\Delta Co = n4 - n3 = \frac{f2 - f1}{C} \cdot Lo \qquad (8)$$

that the increment ΔCo is proportional to the reference length Lo. Accordingly, $$\frac{Lx}{\Delta Cx} = \frac{Lo}{\Delta Co} = \frac{f2 - f1}{C} \qquad (9)$$

$$\therefore Lx = Lo \cdot \frac{\Delta Cx}{\Delta Co}$$

is established. The absolute position data calculation circuit 42 calculates the measurement length Lx from the above equation, and outputs position data Pout of the object.

The position detection apparatus 20 utilizing optical interferometry according to the present invention can detect a position of an object, namely the measurement length Lx, in the form of an absolute position from the measurement point (separation plane) P3. It is unnecessary to first locate an object at a reference position for setting a home position, thereby achieving prompt position detection. Further, it is not necessary for the wavelength of the light beams OL, SOL to be well stabilized as long as the number n of optical waves can be varied in the measurement and reference length Lx, Lo before and after the change of the wavelength so as to ensure the calculation of the increment and decrement Cx, Co. The displacement detection can be performed stably without being effected by the variation in the wavelength of the light beam. Furthermore, when the measurement and reference length Lx, Lo are established under a common ambient environment, wave number data Cx, Co can be affected by a common fluctuation, so that the effects on both data Cx, Co can be balanced with each other during the calculation of the measurement length Lx. A measurement which is resistant to an ambient environment can be obtained.

The above described first embodiment employs two light beams split by polarization for outputting a plurality of signals with different phases from one another. However, the apparatus may employ a standard Fizeau or Michelson interferometer without utilizing polarization. In this case, a polarization mirror may be a partially transmissible plane, and a beam receiver receives two beams of interference light. The mirror may also well be a locally transmissible mirror. A counting circuit may count the fringes of the interference light. In this event, if the reference plane may comprise planes with a step of $\lambda/8$, from each of which interference light is received, the apparatus can detect the direction of movement of an object and the position of an object within $\lambda/2$.

Figure 8:
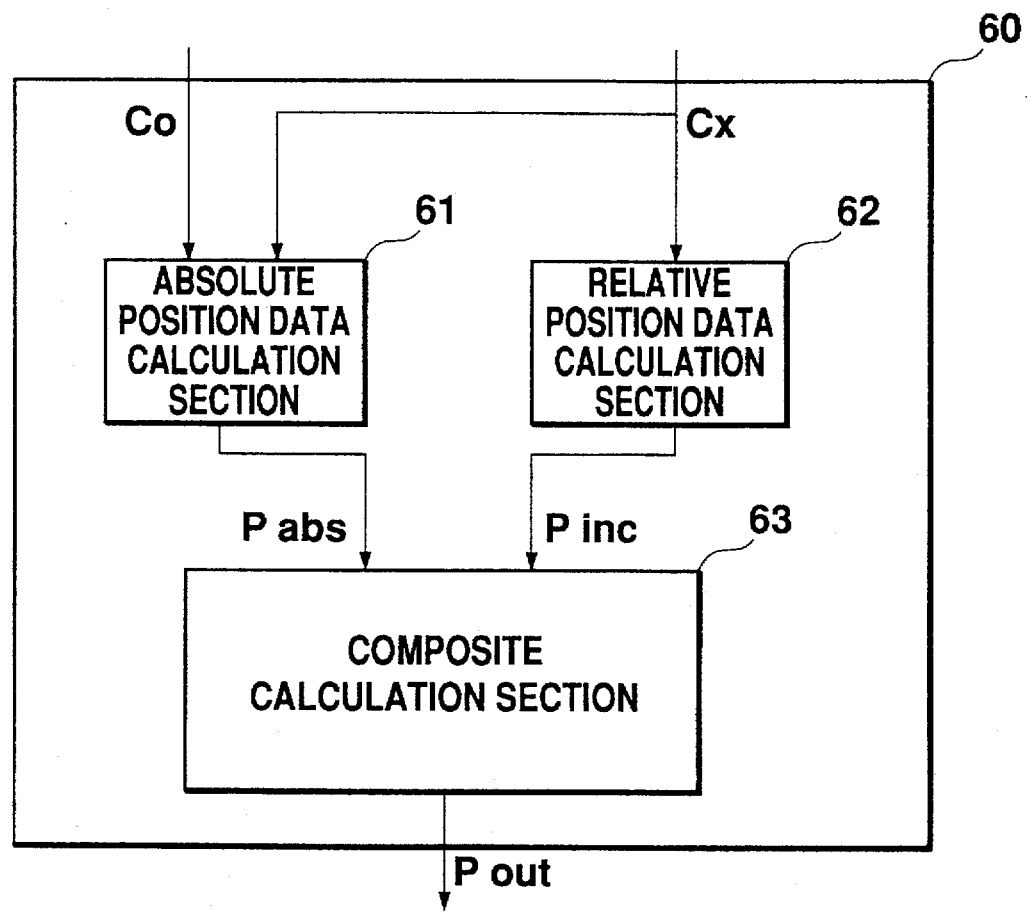
FIG. 8 illustrates a detailed structure of a position data calculating section according to the second embodiment.

The position detection apparatus according to the second embodiment of the present invention is characterized by the structure of a position data calculating section 60, as shown in FIG. 8. The other components have the same structure as that of the position detection apparatus 20 of the first embodiment, so the detailed description can be omitted here.

The position data calculating section 60 includes an absolute position data calculation section 61 and a relative position data calculation section 62. The absolute position data calculation section 61 calculates absolute position data Pabs of an object on the basis of the reference length Lo and the increment and decrement Cx, Co in the number of waves for the interference lights L3, L4 for relative displacement and reference length when the wavelength control section 22 varies the wavelength of the light beam OL. The relative position data calculation section 62 calculates a displacement of the object from its absolute position, that is, relative position data Pinc with respect to its absolute position, on the basis of the increment and decrement Cx in the number of waves in the interference light L6 for relative displacement L6 when the object moves. The absolute position data Pabs and relative position data Pinc of the object are combined in a composite calculation section 63 for an output as position data Pout which indicates the position of the object.

The absolute position data calculation section 61 employs the above described principle in the same manner as the absolute position data calculation circuit 42 in the first embodiment. For instance, the initial position Lini of an object is detected by changing the wavelength of a light beam OL or the like in the initial sequence after the apparatus is turned on The relative position data calculation section 62 calculates a relative displacement Pinc from the initial position Lini on the basis of the following equation:

$$Pinc = \lambda \cdot Cx \qquad (10)$$
$$= \lambda \cdot \frac{N}{2} + \lambda \cdot \frac{\theta}{2\pi} \cdot \frac{1}{2}$$

The position detecting apparatus according to the second embodiment is capable of detecting position data with the wavelength of a light beam being varied, which requires a relatively long response time, only during the initial sequence after the apparatus is turned on. The subsequent sequence can omit the absolute position data being detected through the change of the wavelength, thereby reducing the response time in the subsequent sequences after the initial sequence. Further, unlike an apparatus employing the sole detection of incremental position data, the position detecting apparatus in the second embodiment has an advantage, in which an absolute position of an object can easily be obtained in the absolute position data calculation section 61 even if an erroneous counting has been conducted during the measurement, the last position has become untraceable due to the interruption of the optical path, or the apparatus has been turned on and off during the measurement. It is unnecessary to bring an object to a home position after such an accident.

The position detection apparatus according to the second embodiment has a tendency for the values of relative displacement Pinc come to exhibit non-linear variation compared with the beginning of the detection as the oscillation frequency of a laser beam is varied. The position detection apparatus according to the third embodiment of the present invention can overcome this problem by finding and correcting the variation in the oscillation frequency f, that is, the variation in the wavelength $\lambda$. The other components have the same structure as that in the second embodiment.

Figure 9:
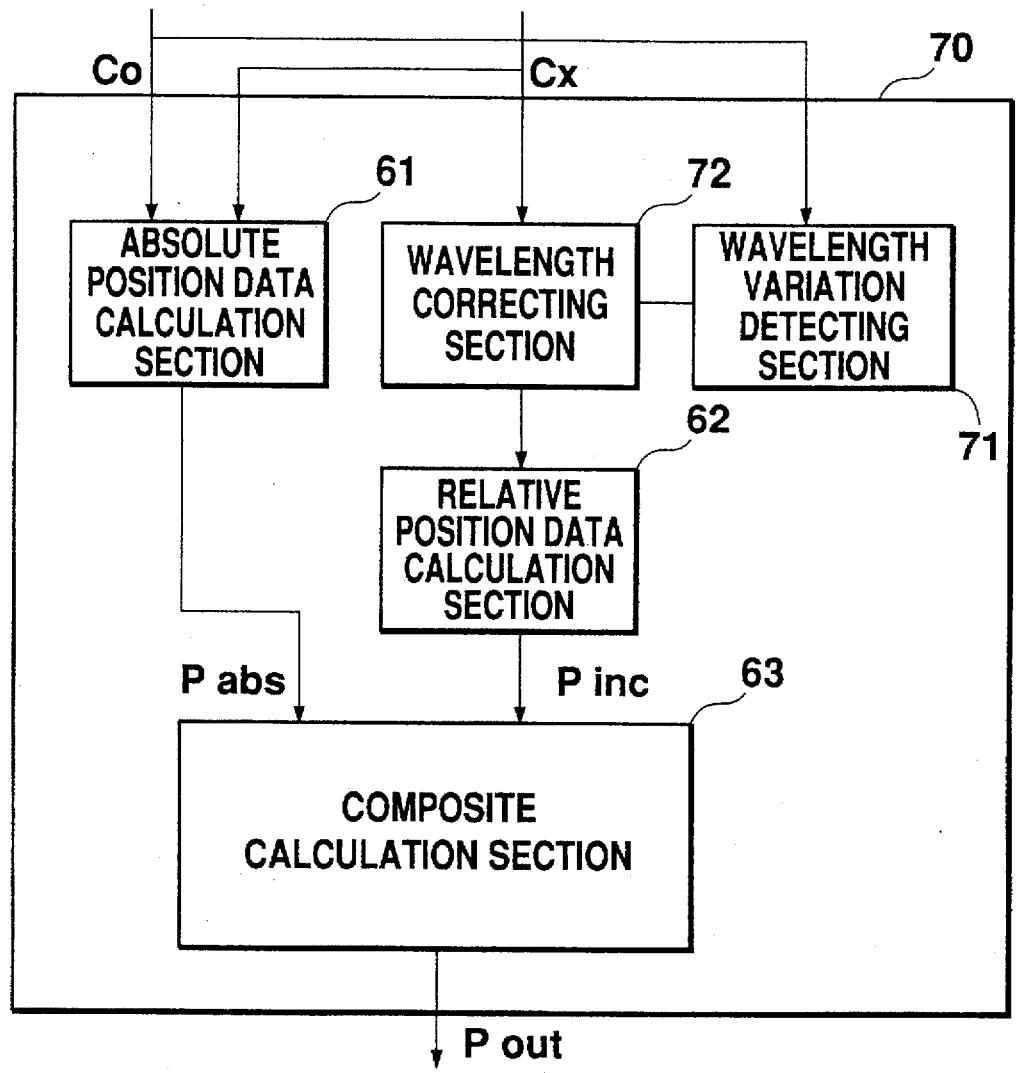
FIG. 9 illustrates a detailed structure of a position data calculating section according to the third embodiment.

FIG. 9 illustrates a position data calculating section 70 according to the third embodiment. The position data calculating section 70 includes a wavelength variation detecting section 71 for detecting variation in the wavelength of the light beam OL from the light source 21 on the basis of the interference light L4 for reference length from the reference length interference section 24, and a wavelength correcting section 72 for correcting relative position data Pinc on the basis of the detected variation of the wavelength.

The wavelength variation detecting section 71 first latches and stores as initial data CoL the increment and decrement Co in the number of waves from the counting circuit 41 at the start of generating a relative position data Pinc. The section 71 then calculates a variation $\Delta\lambda$ in the wavelength after a lapse of a predetermined time based on the following equation by using data Co then measured:

$$\Delta\lambda = \frac{Lo}{Co - CoL} \qquad (11)$$

The wavelength correcting section 72 then calculates wavelength $\lambda c$ using the calculated variation $\Delta\lambda$ on the basis of the following equation:

$$\lambda c = \lambda + \Delta\lambda \qquad (12)$$

Equation 10 can be calculated using the wavelength $\lambda c$ so as to provide Pinc which is corrected by an amount of variation $\Delta\lambda$ in the wavelength. As a result, position data Pout can be obtained having sufficient linearity.

In a case where the position detecting apparatus according to the present invention is used as a relative position detecting apparatus, the apparatus may output Pinc corrected by an amount of variation $\Delta\lambda$ in the wavelength. In this case, an absolute position data calculation section is unnecessary.

It should be noted that the following method can be applied in order to obtain an absolute wavelength of a laser beam.

Assume that a semiconductor laser with $\lambda=780$ nm is used. Define the optical length for the polarization mirror 38 as y, while the optical length for the reflection mirror 39 is defined as y+$\beta$, with the difference in optical length determined as $\beta$ in the reference length interference section 24. The increment and decrement Co in the number of waves with an ideal wavelength $\lambda$ is designated as Coi, whereas the increment and decrement Co in the number of waves by an actual semiconductor laser is designated as Cor. When a light beam having an ideal wavelength $\lambda$ is introduced, a difference $\Delta n$ in the number of waves between the optical paths for the polarization and reflection mirrors 38, 39 can be expressed by:

$$\Delta n = -\frac{y}{\lambda} + \frac{(y+\beta)}{\lambda} \qquad (13)$$

Here, it is possible to identify the ideal wavelength $\lambda$ of the semiconductor laser, the value Coi of data Co for the ideal wavelength $\lambda$, and the difference $\beta$ in optical length.

The actual incident light beam from a semiconductor laser with a wavelength of $(\lambda+\alpha)$ generates a difference $\Delta n'$ in number of waves between the optical lengths for the polarization and reflection mirrors 38, 39 as designated below:

$$\Delta n' = -\frac{y}{(\lambda+\alpha)} + \frac{(y+\beta)}{(\lambda+\alpha)} \qquad (14)$$

Equation (14) represents the counting of the number of waves when the wavelength is changed from $\lambda$ to $(\lambda+\alpha)$, so that the following equation can be obtained:

$$\Delta Co = \Delta n' - \Delta n = \frac{\beta}{\lambda} - \frac{\beta}{(\lambda+\alpha)} \qquad (15)$$

$$\Delta Co = Cor - Coi$$

$$\therefore \alpha = \frac{\lambda'}{(\beta/\Delta Co - \lambda)}$$

Thus, the wavelength $\lambda'$ of the semiconductor laser which is actually used is expressed by:

$$\lambda' = \lambda + \alpha \qquad (16)$$

The wavelength $\lambda'$ an semiconductor laser in use can be measured by setting a known difference $\beta$ in optical length, measuring increment and decrement Co in the number of waves for a stabilized laser having a known reference wavelength $\lambda$, and measuring increment and decrement Co in the number of waves for an actual semiconductor laser for comparison. It is possible to calculate position data with high accuracy without an error caused by the variation in wavelength.

Figure 10:
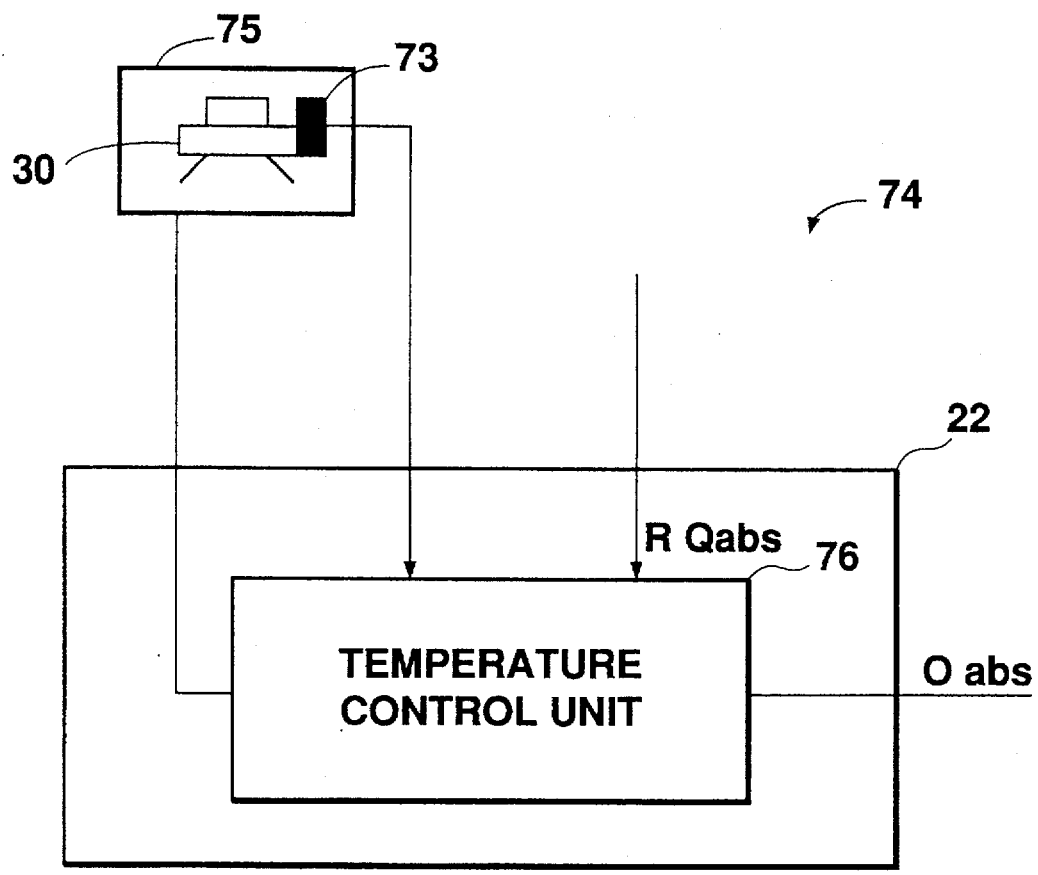
FIG. 10 illustrates an exemplary structure of a wavelength control section.

An example of the wavelength control section 22 will next be described in detail. FIG. 10 illustrates the wavelength control section 22 comprising a temperature sensor 73 for sensing the temperature of the semiconductor laser 30, and a temperature adjuster 74 for adjusting the temperature of the semiconductor laser 30 based on the sensed temperature. The wavelength control section 22 varies the wavelength of the light beam OL by varying the temperature of the semiconductor laser 30.

The temperature adjuster 74 has a heater 75 attached to the semiconductor laser 30, and a temperature control unit 76 for outputting a heating or cooling command to the heater 75. Upon receipt of a request signal RQabs for measuring a position from the position data calculating section 25, the temperature control unit 76 outputs a heating or cooling command to the heater 75 until the temperature of the semiconductor laser 30 becomes a predetermined target temperature. When the temperature sensor 73 determines that the temperature of the semiconductor laser 30 has reached the target temperature, the temperature control unit 76 outputs a detection command Oabs to the position data calculating section 25. The temperature control unit 76 may output a heating or cooling command after an output of the detection command Oabs so as to normalize the wavelength of the semiconductor laser 30. The wavelength of a semiconductor laser 30 depends upon temperature, such as 2.4 nm/10° C. for a wavelength $\lambda=780$ nm, although it sometimes depends on a type of product or its basic wavelength. It should be noted that the present invention does not require an accuracy in variation of the wavelength $\lambda$, so that the wavelength can be roughly changed. The temperature of the semiconductor laser 30 is accordingly not required to be controlled accurately. It is not necessary to conduct feedback control utilizing the temperature sensor 73.

The wavelength control section 22 may vary the oscillation wavelength of an output laser beam by varying the temperature of the connection in a semiconductor through excited current in the semiconductor laser 30. The semiconductor laser driver circuit 31 controls the excited current. The oscillation wavelength is varied toward a longer wavelength as the excited current increases.

Upon receipt of a request signal RQabc for measuring a position, the wavelength control section 22 outputs a drive current controlling signal to the semiconductor laser driver circuit 31. The driver circuit 31 varies the drive current for the semiconductor laser 41 to vary an optical output. When the drive current reaches a desired level so as to obtain a desired temperature level, a detection command Oabs is supplied to the position date detecting section 25. After outputting the detection command Oabs, the wavelength control section 22 may supply the original drive current so as to bring the wavelength of the semiconductor laser 31 back to the normal condition. The wavelength of the semiconductor laser 30 depends upon an electric product such as 4 nm/$\Delta$7 mW for a wavelength of 780 nm, although it may sometimes depend on a type of product or its basic wavelength.

Further, the wavelength control section 22 may cause stress in a medium through which the light beam OL passes, to thereby vary a reflective index of the medium, which leads to a variation in the wavelength of the light beam OL.

Still further, the wavelength control section 22 may apply an electric field to the light beam OL by using electrooptical modulation, to thereby vary a reflective index of the light beam OL, which leads to a variation in the wavelength of the light beam OL. This phenomena is called the Pockels effect. Preferably, the optical path may comprise a material which is significantly affected by this phenomena.

Furthermore, the wavelength control section 22 may apply a magnetic field to the light beam OL by using magneto-optic modulation, to thereby vary a reflective index of the light beam OL, which leads to a variation in the wavelength of the light beam OL. This phenomena is called the Faraday effect. Preferably, the optical path may comprise a material which is significantly affected by this phenomena.

Still further, the wavelength control section 22 may rotate a rotatable plane with a predetermined reflective index at a high velocity, so that the wavelength of the light beam OL is varied through a Doppler effect of the light beam OL which passes through the rotatable plane.

Alternatives for determining the reference length Lo in the reference length interference section 24 will next be described in detail.

Figure 11A:
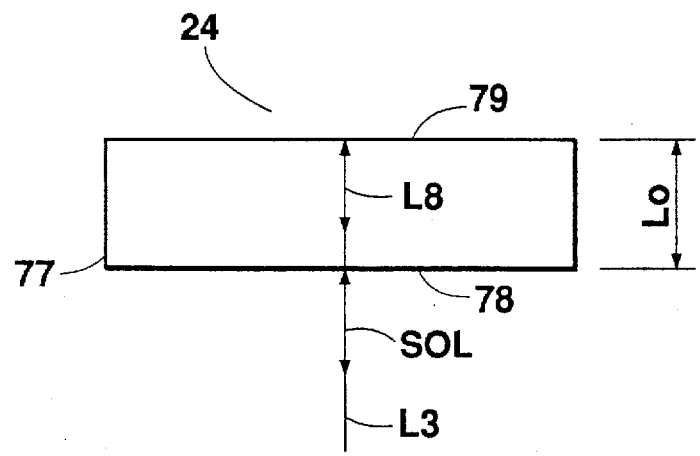
FIGS. 11A to 11C illustrate examples of an interference unit in the reference length interference section.

FIG. 11A illustrates an interference unit comprising a glass plate 77. The glass plate 77 has a polarization mirror 78 as an incident plane, and a reflection mirror 79 positioned at the reference length Lo from the polarization mirror 78. The reference light L7 out of the light beams SOL having orthogonal polarization planes is reflected at the polarization mirror 78 in the glass plate 77. The measurement light L8 is transmitted through the polarization mirror 78 and is then reflected at the reflection mirror 79 to exit from the glass plate 77. The reflected reference and measurement light L7, L8 are brought together so as to form interference light L4 for reference length directed toward the beam receiver 57. It is accordingly possible to simplify the structure by incorporation of the reference and measurement planes into the interference unit 37. The polarization mirror 77 may comprise a partially or locally transmissible plane for a measurement without polarization. Alternatively, the mirror planes 77 and 78 may be substituted by a general glass plane so as to utilize its reflection or transmission characteristics. The reflection mirror 79 may be formed as a cubic.

Figure 11B:
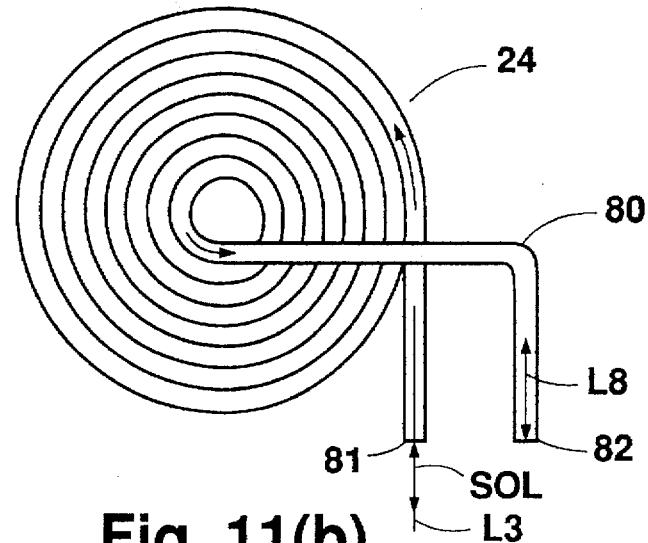

FIG. 11B illustrates an interference unit made of an optical fiber 80. The optical fiber 80 has a polarization mirror 81 as an incident plane at one end. The other end is subjected to a reflection treatment so as to have a mirror 82. The reference light L7 out of the light beams SOL having orthogonal polarization planes is reflected at the polarization mirror 81. The measurement light L8 is transmitted through the polarization mirror 81 and then advances through the optical fiber 80. The mirror 82 reflects the measurement light L8 back along the optical fiber 80. The light L8 finally exits from the incident plane. The reflected reference and measurement lights L7, L8 are brought together so as to form interference light L4 for reference length, directed toward the beam receiver 57. Although it is difficult to take a longer reference length Lo in the interference unit 37 shown in FIG. 2, the utilization of an optical fiber enables an interference unit of a longer reference length with a simple structure and a reduced space. The polarization mirror 81 may of course comprise a partially or locally transmissible plane, and the mirror planes 81 and 82 may utilize reflection or transmission of a general optical fiber.

Figure 11C:
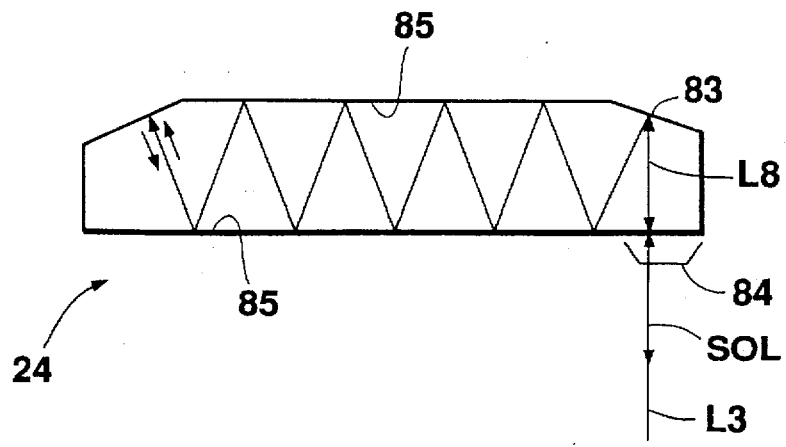

The interference unit shown in FIG. 11C includes a polarization mirror 84 attached to a housing 83 as an incident plane, and a reflection mirror 85 for subjecting an introduced light beam within the housing 83 to continuous reflection until it finally exits from the incident plane. The reference light L7 out of the light beams SOL having orthogonal polarization planes is reflected at a polarization mirror 84 in this interference unit. The measurement light L8 is transmitted through the polarization mirror 84 and is then subjected to continuous reflection at the reflection mirror 85 within the housing 83 until it finally exits from the incident plane. The reflected reference and measurement light L7, L8 are brought together so as to form an interference light L4 for reference length, directed toward the beam receiver 57. This interference unit enables the reference length of a longer path with a reduced space, similar to the case in FIG. 11b.

Although light beams reflected from the polarization mirrors 78, 81, 84 and the reflection mirrors 79, 82, 85 are brought together for an output in the foregoing FIGS. 11A to 11C, light beams can be supplied as transmission light. In this case, the polarization mirrors 78, 81, 84 and the reflection mirrors 79, 82, 85 may comprise a partially transmissible plane (a partially reflecting plane). Assume that this structure is employed in FIG. 11A. The reference length light beam SOL from the light source 21 is partially transmitted through the polarization mirror 78 and advances toward the reflection mirror 79 which is a partially transmissible plane. The reflection mirror 79 allows the light beam SOL to be partially transmitted to the outside. The polarization mirror 78 allows the reflected light beam SOL to be partially reflected at the reflection mirror 79. The light beam SOL is thereafter transmitted through to the reflection mirror 79. The last transmitted light beam and the initial transmitted light beam both through the reflection mirror 79 are brought together so as to form interference light, directed toward the beam receiver 57. The interference of the transmission light beams, contrary to the interference of the reflected light beams, enables the beam splitter 55 to be omitted so as to simplify the structure, since the light beams do not travel toward the light source 21. Further, it is possible to integrate the beam receiver 57 and the interference unit 37 together, thereby leading to a compact apparatus.

Figure 12:
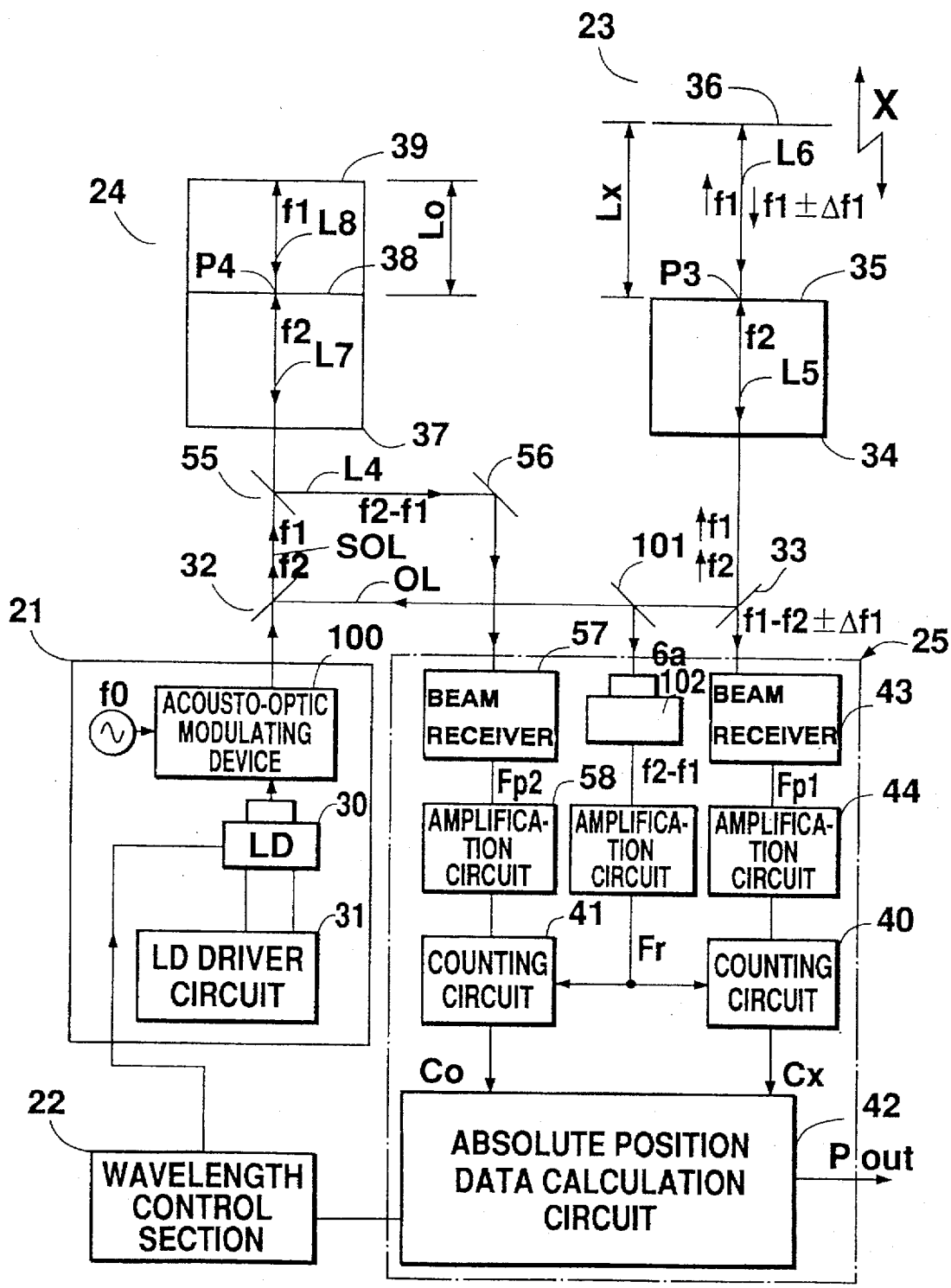
FIG. 12 illustrates an exemplified structure of a position detecting apparatus utilizing optical interferometry according to the fourth embodiment.

FIG. 12 illustrates a position detecting apparatus utilizing optical interferometry according to a fourth embodiment of the present invention. The fourth embodiment employs the optical heterodyne method using a light source with light beams of different wavelengths. Since the optical heterodyne method of this type has been described in detail referring to FIG. 13, the detailed explanation thereof is not presented here. The structures similar to those in the foregoing first embodiment are given the same reference numerals, so the detailed description thereof is omitted.

The position detecting apparatus according to the fourth embodiment comprises the light source 21 which includes an acousto-optic modulating device 100 for modulating the frequency of a light beam OL emitted from the semiconductor laser 30. The acousto-optic modulating device 100 modulates the light beam OL to provide light beams OL, for an output, of frequencies f1, f2 on orthogonal polarization planes. The frequencies f1, f2 have a frequency difference f0.

The output light beam OL is supplied to the relative displacement interference section 23 and to a photoelectric device 102 of the position data calculating section 25 via a beam splitter 101. The light beam OL supplied to the relative displacement interference section 23 is split into measurement light L6 of frequency f1 and reference light L5 of frequency f2. The reference and measurement lights L5, L6 are respectively reflected at the mirrors 35, 36 and are brought together. When the reflection mirror 36 is relatively displaced, the measurement light L6 is subjected to Doppler modulation, whereby the frequency thereof is varied to be f1±Δf. The interference light L3 for relative displacement, which has been formed by bringing the light beams together, is photoelectrically converted in the beam receiver 43 in the position data calculating section 25 so as to provide an electrical signal Fp1 having a beat frequency f2−(f1±Δf). As described above, a phase shift is measured on the basis of the electrical signal Fp1 and the reference signal Fr of a beat frequency f2−f1 from the photoelectric device 102. An amount of displacement can be calculated on the basis of the measured phase shift. When the wavelength control section 22 varies the wavelength of the semiconductor laser 30 by Δλ, the number of the waves is varied in the optical lengths between the polarization mirror 35 (a split plane P3) and the reflection mirror 36. This variation apparently presents a displacement X, so that increment and decrement Cx in the number of waves can be obtained as position data of the object.

The reference length light beam SOL separated from the light beam OL is supplied to the reference length interference section 24 so as to form interference light L4 for reference length in a similar way to the relative displacement interference section 23. The interference light L4 has a phase shift corresponding to the reference length Lo. The interference light L4 for reference length is photoelectrically converted in the beam receiver 47 of the position data detection section 25, so that an electrical signal Fp2 of a beat frequency f2–f1 is output. As described above, a phase shift is measured on the basis of the electrical signal Fp2 and the reference signal Fr of a beat frequency f2–f1 from the photoelectric device 102. An amount of displacement is accordingly calculated on the basis of the measured phase shift. The change of frequency of the semiconductor laser 30 enables increment and decrement Co in the number of waves to be obtained.

The counted increment and decrement Co, Cx in the number of waves are proportional to the reference length Lo and the measurement length Lx, respectively, so that the measurement length Lx can be calculated based on the equation (9). The calculated measurement length Lx is output as absolute position data Pout.

The calculation of the increment and decrement Co, Cx in the number of waves can be conducted, unlike the foregoing first embodiment, using AC signals Fr, Fp1 and Fp2, so that the disadvantage due to the variation in DC level can be prevented. Further, any unnecessary frequencies due to noise can be cut off, leading to stable detection.

It should be noted that the oscillation frequency may be controlled, as shown in FIG. 13, by introducing the light beam OL into a laser tuning circuit. The light source 21 may comprise a He—Ne laser, not shown, in place of a semiconductor laser 30. In this case, the Zeeman effect may be utilized to obtain two types of light beam. This effect is known to utilize the fact that a spectrum is split due to a strong magnetic field. The Zeeman effect can be realized by locating a laser tube within a magnetic field formed by a coil supplied with a voltage. Alternatively, the generation of two types of light beam can be achieved by any other method.

What is claimed is:

1. A position detecting apparatus utilizing optical interferometry, comprising:

a light source capable of emitting a light beam having an interference capability;

a wavelength control section capable of varying a wavelength of the light beam emitted from the light source;

a relative displacement interference section capable of bringing reference light and measurement light together so as to output interference light for relative displacement, said reference light having been separated from the light beam at a separation plane and reflected from a reference plane, said measurement light having been separated from the light beam and reflected from a measurement plane defined on an object;

a reference length interference section capable of bringing rays of light together so as to output interference light for reference length on the basis of a reference length light beam separated from the light beam, said rays of light having a fixed difference in optical length corresponding to a predetermined reference length; and a position data determining section capable of determining position data of the object on the basis of the predetermined reference length and variation in optical intensities of the interference light for relative displacement and reference length when the wavelength control section varies the wavelength of the light beam.

2. A position detecting apparatus utilizing optical interferometry, comprising:

a light source capable of emitting a light beam having an interference capability;

a wavelength control section capable of varying a wavelength of the light beam emitted from the light source;

a relative displacement interference section capable of bringing reference light and measurement light together so as to output interference light for relative displacement, said reference light having been separated from the light beam at a separation plane and reflected from a reference plane, said measurement light having been separated from the light beam and reflected from a measurement plane defined on an object;

a reference length interference section capable of bringing rays of light together so as to output interference light for reference length on the basis of a reference length light beam separated from the light beam, said rays of light having a fixed difference in optical length corresponding to a predetermined reference length, the reference length interference section comprising:

a first reference plane for reference length capable of reflecting the ray separated from the reference length light beam at separation plane, and a second reference plane for reference length capable of reflecting the ray separated from the reference length light beam at the separation plane, the interference light being formed by bringing together the rays from the first and second reference planes, said ray from the second reference plane having the fixed difference in optical length corresponding to the predetermined reference length with respect to the ray from the first reference plane; and a position data determining section capable of determining position data of the object on the basis of the predetermined reference length and variation in optical intensities of the interference light for relative displacement and reference length when the wavelength control section varies the wavelength of the light beam, the position data determining section comprising:

a first counting circuit capable of counting increment and decrement, Co, of waves in the interference light for reference length when the wavelength of the light beam is varied, a second counting circuit capable of counting increment and decrement, Cx, of waves in the interference light for relative displacement when the wavelength of the light beam is varied, and an absolute position data calculation circuit capable of calculating a position Lx of the object with respect to the separation plane in the relative displacement interference section on the basis of an equation, $Lx=Lo(Cx/Co)$, wherein Lo is the reference length defined between the separation and measurement planes defined on an object in the reference length interference section.

3. A position detecting apparatus utilizing optical interferometry, comprising:

a light source capable of emitting a light beam having an interference capability;

a wavelength control section capable of varying a wavelength of the light beam emitted from the light source;

a relative displacement interference section capable of bringing reference light and measurement light together so as to output interference light for relative displacement, said reference light having been separated from the light beam at a separation plane and reflected from a reference plane, said measurement light having been separated from the light beam and reflected from a measurement plane defined on an object;

a reference length interference section capable of bringing rays of light together so as to output interference light for reference length on the basis of a reference length light beam separated from the light beam, said rays of light having a fixed difference in optical length corresponding to a predetermined reference length; and a position data determining section capable of determining position data of the object on the basis of the predetermined reference length and variation in optical intensities of the interference light for relative displacement and reference length when the wavelength control section varies the wavelength of the light beam, the position data determining section comprising:

an absolute position data calculation section capable of calculating absolute position data of the object on the basis of the reference length and the variation in optical intensities for the interference lights for relative displacement and reference length when the wavelength control section varies the wavelength of the light beam, a relative position data calculation section capable of calculating relative position data of the object with respect to an absolute position of the object on the basis of the variation in optical intensity for the interference light for relative displacement in response to movement of the object, and a composite calculation section for combining the absolute and relative position data so as to determine a position of the object.

4. A position detecting apparatus according to claim 1 wherein the reference length interference section comprises:

a first reference plane for reference length capable of reflecting the ray separated from the reference length light beam at a separation plane; and a second reference plane for reference length capable of reflecting the ray separated from the reference length light beam at the separation plane;

the interference light being formed by bringing together the rays from the first and second reference planes, said ray from the second reference plane having the fixed difference in optical length corresponding to the predetermined reference length with respect to the ray from the first reference plane.

5. A position detecting apparatus according to claim 1 wherein the position data determining section further comprises:

a wavelength variation detecting section for detecting variation in the wavelength of the light beam from the light source on the basis of the interference light for reference length from the reference length interference section; and a wavelength correcting section for correcting the relative position data on the basis of the variation detected by the wave length variation detecting section.

6. A position detecting apparatus according to claim 1 wherein the light source comprises a semiconductor laser, and the wavelength control section varies a wavelength of the light beam by changing temperature of the semiconductor laser.

7. A position detecting apparatus according to claim 1 wherein the wavelength control section varies a wavelength of the light beam by causing stress in a medium, through which the light beam is transmitted, so as to change a refractive index of the medium.

8. A position detecting apparatus according to claim 1 wherein the wavelength control section varies a wavelength of the light beam by applying an electrical and/or a magnetic field to a medium, through which the light beam is transmitted, so as to change a refractive index of the light beam.

9. A position detecting apparatus according to claim 1 wherein the wavelength control section varies a wavelength of the light beam by Doppler effect caused by rotation of a rotatable plate of a predetermined refractive index.

* * * * *